United States Patent [19]
Adams

[11] 3,800,471
[45] Apr. 2, 1974

[54] FLOWER POT WITH WATER RESERVOIR

[75] Inventor: Alfred O. Adams, Spokane, Wash.

[73] Assignee: Roy J. Adams, Olympia, Wash.; a part interest

[22] Filed: Apr. 16, 1973

[21] Appl. No.: 351,287

[52] U.S. Cl................. 47/38, 206/46 PL, 47/34
[51] Int. Cl............................................ A01g 27/00
[58] Field of Search ............... 47/38, 38.1, 34, 1.2; 206/46 PL

[56] References Cited
UNITED STATES PATENTS

| 3,243,919 | 4/1966 | Carlson................................. 47/38 |
| 954,440 | 4/1910 | Klemm.................................. 47/38 |
| 2,387,340 | 10/1945 | Morlarty................................ 47/38 |
| 129,451 | 7/1872 | Baldwin................................ 47/38 |
| 910,905 | 1/1909 | Clements.............................. 47/38 |
| 2,741,875 | 4/1956 | Van Staalduinen................... 47/38 |

FOREIGN PATENTS OR APPLICATIONS

| 659,846 | 10/1951 | Great Britain......................... 47/38 |
| 1,470,367 | 2/1967 | France.................................. 47/38 |
| 536,538 | 12/1955 | Italy................................. 47/38.10 |
| 1,423,079 | 11/1965 | France.................................. 47/38 |

Primary Examiner—Robert E. Pulfrey
Assistant Examiner—Eugene H. Eickholt
Attorney, Agent, or Firm—Wells, St. John & Roberts

[57] ABSTRACT

A flower pot comprises an upwardly open container having a closed, watertight bottom wall and upright side walls. A plurality of apertures are spaced about the side walls at a predetermined elevation above the bottom. A reservoir basically comprising an H-shaped channel is supported in the bottom of the pot with the cross member or top of the channel at approximately the same level as the apertures in the side wall. The reservoir provides a space in the bottom of the pot void of soil and, because of apertures formed in its walls and top, allows free passage of water into and out of the space. The elevational spacing of the apertures in the side of the container facilitates filling of the container with water up to the level of the apertures. The reservoir then is also filled with water which is allowed to gradually escape through the holes therein over an extended period of time.

1 Claim, 4 Drawing Figures

PATENTED APR 2 1974 3,800,471

FLOWER POT WITH WATER RESERVOIR

BACKGROUND OF THE INVENTION

Conventional planters, widely used both by horticulturists and by gardening hobbyists generally comprise a pot having an aperture formed through the bottom to allow for ventilation and watering purposes. Often these pots are provided with a waterproof holder in which the pots are placed to prevent water from running out the hole and onto supporting furniture or other inconvenient places.

A primary disadvantage of the above conventional planters is their inability to store water, making watering of the plant held therein a frequent task. Another disadvantage is that the bottoms of the pots are usually flat so that when the pot is placed in a protective holder, the aperture is closed. This allows water to build up within the pot and oversaturate the soil, drowning the plant.

These problems have been realized to some extent by the flower pots described in the following U.S. Pats:

No. 129,451 granted to G. Baldwin,
No. 195,094 granted to J. Crowther,
No. 842,501 granted to A. J. Schoenecke,
No. 910,905 granted to J. Clements,
No. 1,077,423 granted to A. S. Myers,
No. 2,130,234 granted to G. Haglund,
No. 2,387,340 granted to M. A. Moriarty,
No. 2,810,235 granted to S. H. Magid,
No. 3,243,919 granted to O. T. Carlson.

Baldwin shows a disc at the lower end of a flower pot having perforations supposedly permitting water vapor from below the disc to maintain moisture in the soil above the disk. Evaporating moisture, however, is insufficient to accomplish this result. In contrast, direct capillary attraction is used in the present disclosure to assure adequate soil moisture and transfer of water from a storage reservoir to the upper portion of the container.

The Crowther patent describes a pot having a false conical-shaped bottom having perforations therein which creates space between the soil and the bottom of the pot. The Crowther pot includes apertures within the side walls of the pot, which communicate with the space between the false bottom and the bottom of the pot, through which water is introduced to the space. The water is then drawn through the apertures in the conical-shaped false bottom to the soil contained in the pot. Soil is apparently free to fall through the false bottom and would eventually fill the space below it.

The A. J. Schoenecke and O. T. Carlson patents both disclose flower ports wherein additional water is supplied from a reservoir within the pots to the soil through a porous wick material such as sponge rubber.

The J. Clements patent discloses a flower pot support for jardinieres which simply comprises a hollow support having holes formed in the side walls thereof which sits in the bottom of the jardinieres with the potted plant sitting on its top surface. The support spaces the bottom of the pot elevationally above the floor of the jardiniere so that water in the bottom of the jardiniere and lower part of the support will be taken up by evaporation within the jardinieres and carried into the flower port through the bottom opening thereof.

The Myers patent discloses a plant holder or hanging basket having a false bottom spaced above a watertight bottom to create an air space between the watertight bottom and the soil within the plant holder. Apertures are included in the side walls which allow water to be accumulated only to the level of the apertures.

The G. Haglund patent discloses a flower port that also utilizes a false bottom to create a space between the bottom of the soil and the bottom of the flower pot, wherein the false bottom itself is utilized to provide water to the soil within the pot by capillary action of porous bodies within the bottom. The pot includes apertures formed through the side walls of the pot and spaced upwardly from the bottom to facilitate watering and allow water overflow.

The Moriarty patent describes a humidified flower pot or container having double thickness side walls along with a false bottom spaced above a watertight bottom. The thickness between the walls is segmented into channels some of which are utilized to supply water to the soil within the pot through apertures formed through the inner wall adjacent the false bottom. The remaining channels then open into the area between the false bottom and the watertight bottom to allow for ventilation of the soil within the pot.

The S. H. Magid patent describes a flower pot and jacket for same which comprises an ordinary flower pot having its outer periphery enclosed by a container. The container is spaced from the flower pot so that a supply of water or other liquid may be held in the space between the container and the pot for feeding the interior of the pot.

The apparatus of the present invention comprises an upwardly open container having a watertight bottom and substantially vertical side walls. A plurality of apertures are formed through the side walls at a predetermined distance above the bottom wall. An elongated reservoir is provided within the container and comprises a spaced pair of side walls connected by a top wall overlapping a portion of the bottom wall. The reservoir is supported by the bottom wall of the container so that the elevation of the top wall is substantially equal to that of the apertures formed in the side walls. The reservoir includes apertures formed therethrough which allow free passage of water between the reservoir and the soil surrounding the reservoir within the container.

SUMMARY OF THE INVENTION

The flower pot disclosed herein comprises an upwardly open soil container having horizontal bottom walls and substantially upright side walls. A plurality of apertures are formed through the side walls and are spaced a predetermined distance above the bottom wall. A water reservoir, formed as an elongated channel by spaced upright side walls and a top wall extending between the side walls, is supported on and overlaps a portion of the bottom wall of the container. A plurality of apertures extend through the side walls and the top wall of the reservoir. The top wall of the reservoir is spaced above the bottom of the container a distance substantially equal to the distance from the bottom of the container to the apertures in the side wall of the container.

A first object of this invention is to provide a flower pot including means in the form of a reservoir filled with water which serves to greatly prolong the intervals between watering operations.

Another object is to provide such a flower pot that is relatively simple in construction and thereby inexpensive in manufacture.

Another object is to provide such a flower pot that is sufficiently attractive in appearance to be utilized in the home without additional adornment.

These and other objects and advantages will become evident upon reading the following disclosure with reference to the attached drawings.

A BRIEF DESCRIPTION OF THE DRAWINGS

DETAILED DESCRIPTION OF A PREFERRED EMBODIMENT

Figure 2:
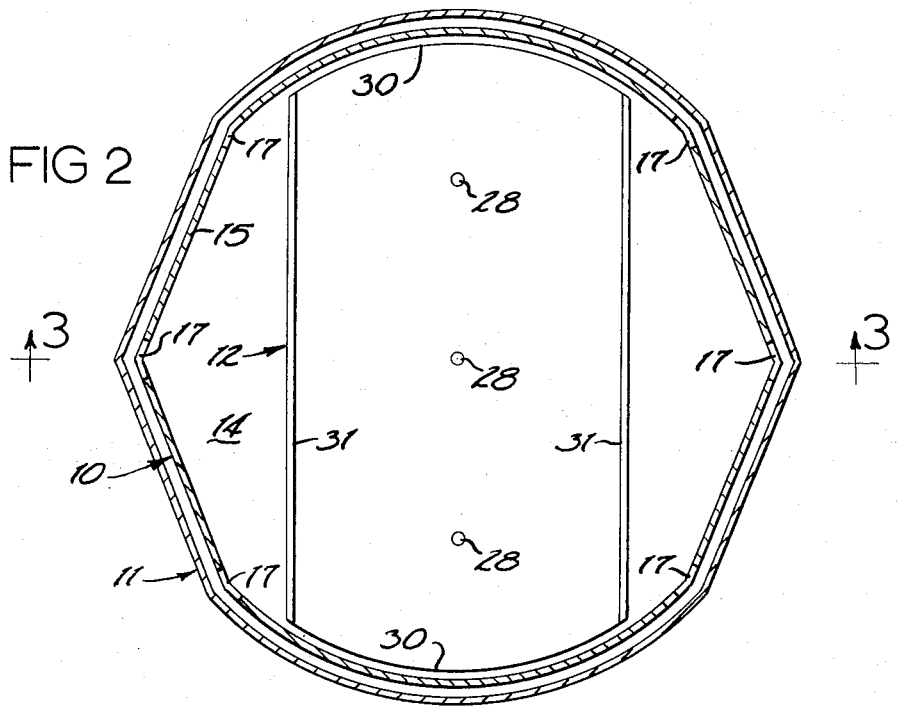
FIG. 2 is a sectional view taken along line 2—2 in FIG. 1.

Referring to the drawings in greater detail, the flower pot is shown comprising three basic elements; an upwardly open container 10, a container receptacle 11, and a water reservoir 12. The container receptacle 11 supports the container, and the reservoir 12 is removably supported within the container.

Figure 1:
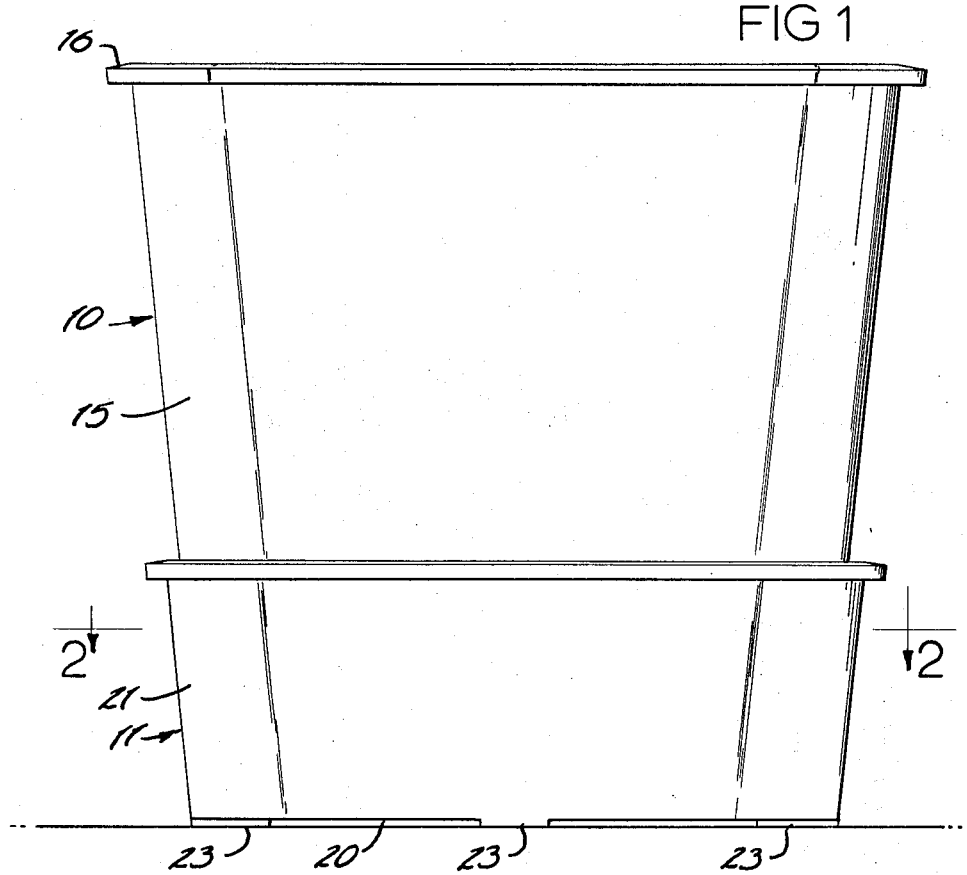
FIG. 1 is an elevational view of the flower pot.

The container 10, formed of any suitable watertight material such as metal, plastic, or glazed clay, comprises a watertight bottom wall 14 and upright side walls 15 extending upwardly therefrom to a top rim 16 (FIG. 1). The container is illustrated as being part circular and partly polygonal in cross section (FIG. 2). It should be noted, however, that this shape is shown only as a single example of many possible cross sectional shapes.

The container includes a number of apertures 17 (FIGS. 2, 3) extending through the side walls at a common elevation above the bottom wall 14. The height of the apertures 17 defines a moisture or liquid level within the container which prevents overwatering by allowing excess water or other liquid in the container to flow through the apertures until a liquid level is achieved that is even in elevation with the bottom of the apertures.

The elevation of the apertures may vary with the size of the container. I have found that with the reservoir 12 in place, the elevation of the apertures may be such that approximately 15% of the total volume inside the container should be located between the apertures and the bottom wall 14.

Figure 3:
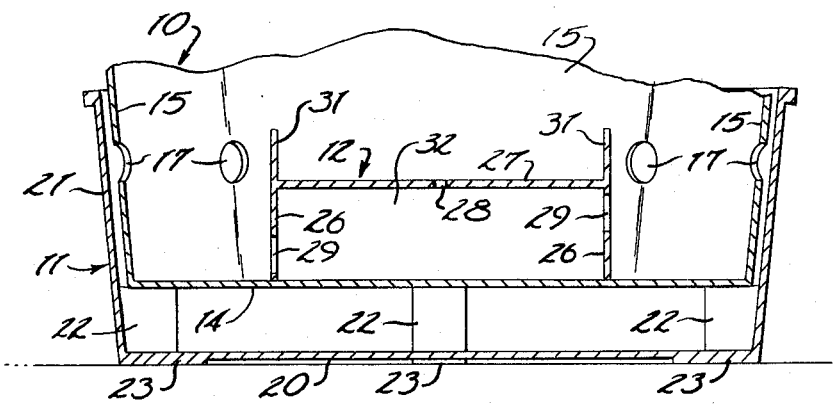
FIG. 3 is an elevational sectioned view taken along line 3—3 in FIG. 2.

The container receptacle 11 is provided to catch overflow water or other fluid flowing from the apertures 17. It includes watertight bottom and side walls 20 and 21 respectively. The side walls, as shown in FIG. 3 are spaced outwardly from the side walls 15 of the container and extend upwardly from the bottom 20 to an elevation above the apertures 17. Upwardly projecting supports 22 are provided within the receptacle 11 to support the container 10 above the bottom 20 of the receptacle, thereby creating a space between the bottom 14 of the container and the bottom 20 of the receptacle wherein overflow water may be safely received and stored. The receptacle 11 is also provided with legs 23 which support the receptacle slightly above a supporting surface as shown in FIG. 3 to protect the supporting surface.

Figure 4:
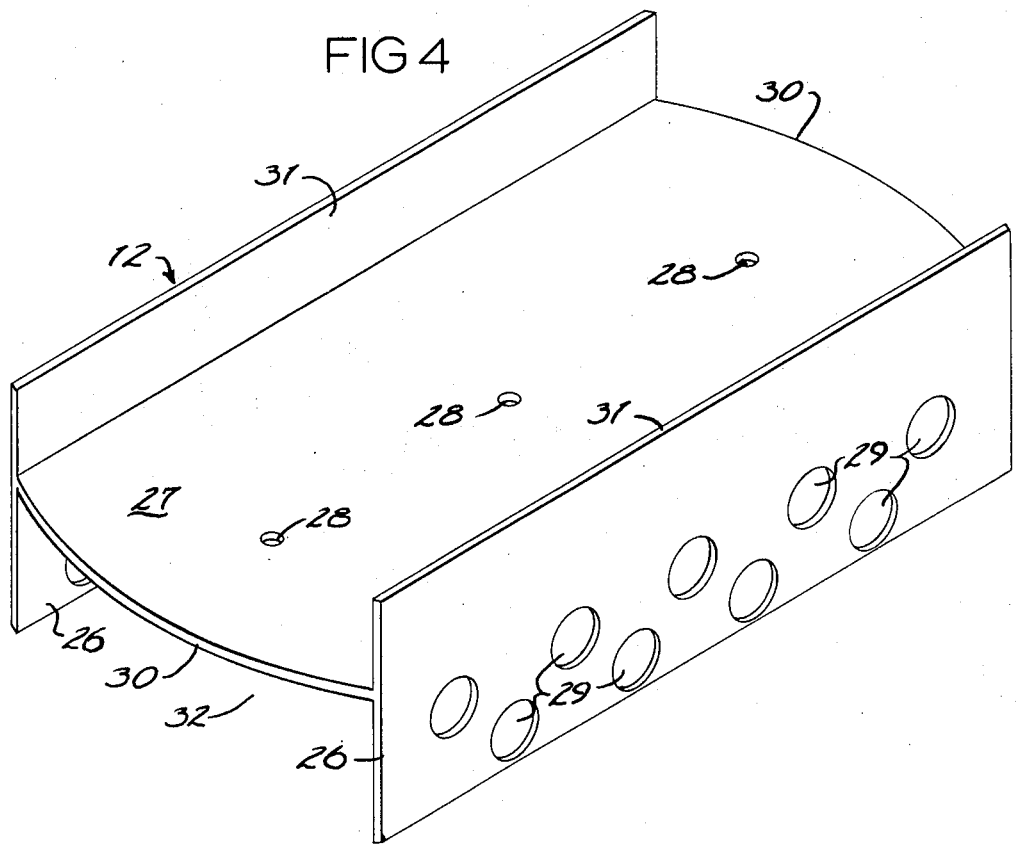
FIG. 4 is an isometric view of the reservoir.

Reservoir 12, shown in greater detail in FIGS. 3 and 4, is H-shaped in cross section and rests on the bottom 14 of the container 10. It comprises upright sides 26 and a top 27 joining the sides. The sides 26 are spaced transversely apart and extend longitudinally across the bottom 14 of the container between open end portions 30 of the reservoir. Top 27 extends between the sides at an elevation substantially equal to that of the apertures 17 in the container side walls 15 (FIG. 3). The top 27 along with sides 26 and that portion of the container bottom wall 14 overlapped by the reservoir, form an elongated void or channel 32 across the bottom of the container. I have found, to provide an optimum ratio of water to soil, that approximately two-thirds of the surface area of bottom 14 should be overlapped by the reservoir.

The top 27 of reservoir 12 is provided with small apertures 28 which are sufficiently small to prevent soil from falling into the channel 32 but will allow free flow of water therethrough. Sides 26 are also provided with apertures 29 as shown in FIGS. 3 and 4 which are of substantially larger diameter than apertures 28.

Since the apertures 29 are formed through substantially vertically oriented walls 26, soil is prevented from entering into the channel 32 unless it is forced laterally. The normal consistency of potting soil or other medium utilized in flower pots is such that the apertures may be as large as three-eighths of an inch in diameter and still not normally permit passage of the soil laterally into the channel. The apertures are located at different elevations through the sides 26 between the top 27 and bottom 14 of the container.

The sides 26 include upper portions 31 extending above the top 27 to an elevation above the apertures and side walls 15 of the container 10. Upper portions 31 act as deflectors to direct water seeping down through the soil towards the apertures 28 in the top 27 of the reservoir.

Two methods of watering may be utilized with the present invention. The first and preferable method is to remove the container from the receptacle and immerse it for up to one hour in a basin filled with sufficient water to rise about the sides of the container to an elevation slightly below the elevation of the soil within the container. After the prescribed time, the container may be removed from the basin, left to drain for a few minutes, and then replaced in the receptacle.

The second method is to remove the container from the receptacle and slowly pour water into the top of the container until it flows freely from the apertures 17. The container may then be placed back in the receptacle.

Both of the above methods assure that the reservoir is full of water and that the soil in the container is damp. The water will remain within the reservoir until the dampness is drawn from the soil either by the roots of the plant or by evaporation. Once this happens the water within the reservoir will be slowly drawn out through the apertures 28 and 29 by capillary attraction of the soil. I have found that by providing such a reservoir that the intervals between watering operations is substantially lengthened.

It may become evident from the above description and accompanying drawings that various modifications and changes may be made therein without departing from the intended scope of this invention. Only the following claims, therefore, are intended to define this invention.

What I claim is:

1. A flower pot, comprising:

an upwardly open container formed by a watertight horizontal bottom wall and upright side walls extending upwardly from the bottom wall to a rim, said rim being continuous about the container opening;

a plurality of apertures formed through the container side walls, said apertures being spaced a common predetermined distance above the container bottom wall;

a water reservoir, supported by the bottom wall of the container, in the form of an elongated channel overlapping 2/3 of the surface area of the bottom wall, defined by transversely spaced upright side walls and a horizontal top wall said side walls extending upwardly from the bottom wall past the elevation of the apertures formed through the container side walls, and said horizontal top wall extending between the side walls at an elevation above the bottom wall equal to the elevation of the side wall container apertures above the bottom wall, said side walls and top wall of the reservoir extending longitudinally between ends spaced closely adjacent opposed sections of the container side walls;

a plurality of apertures formed through the side walls of the reservoir at varying elevations between the bottom wall of the container and the top wall of the reservoir; and a plurality of apertures formed through the top wall of the reservoir.

* * * * *